July 15, 1930. J. H. WAGENHORST 1,770,720
AUTOMOBILE RIM WITH DETACHABLE SIDE RING
Filed Jan. 19, 1923
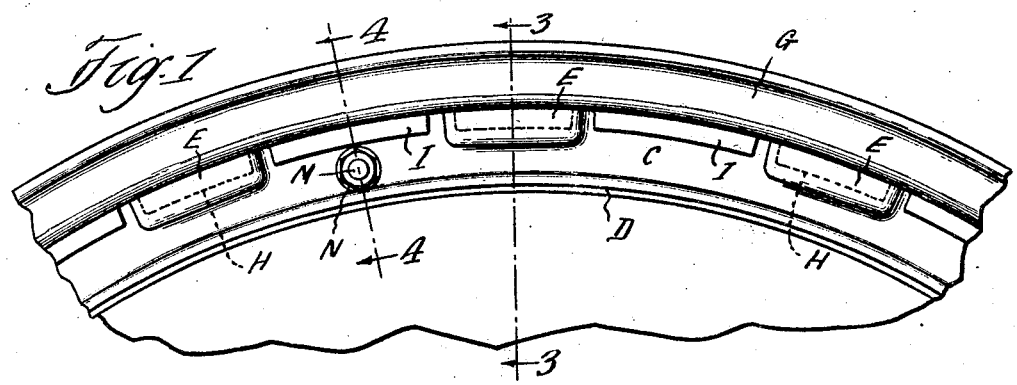
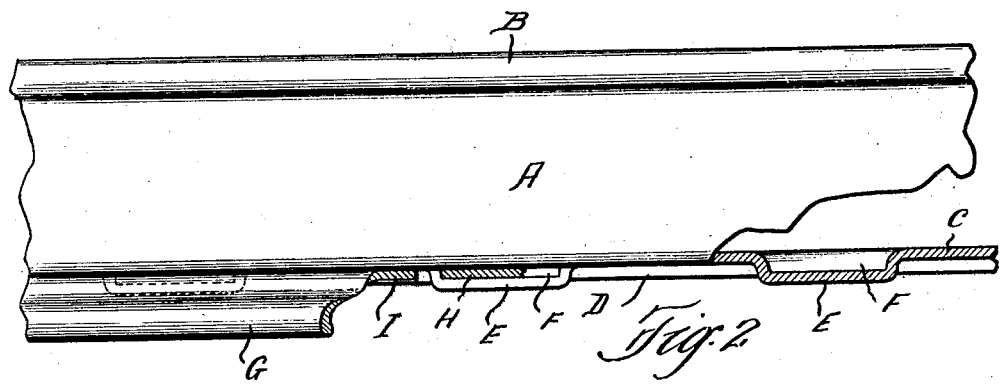
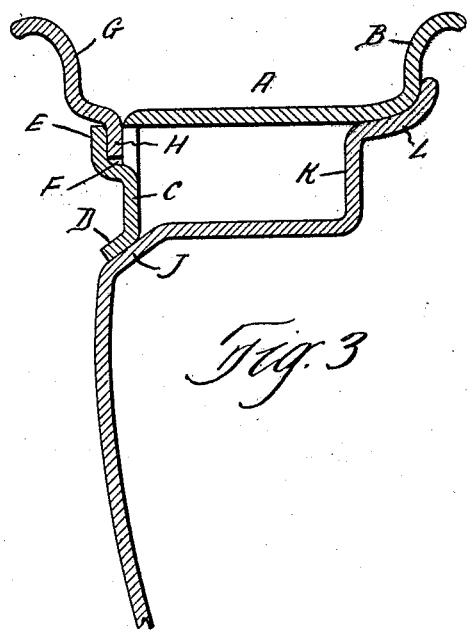
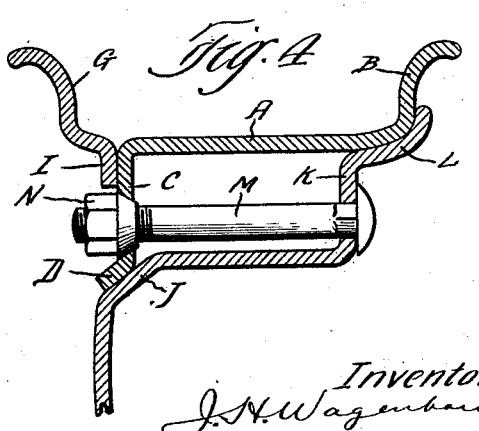
Inventor
J. H. Wagenhorst
By Hull Brock & West
Attys.

Patented July 15, 1930

1,770,720

UNITED STATES PATENT OFFICE

JAMES H. WAGENHORST, OF JACKSON, MICHIGAN

AUTOMOBILE RIM WITH DETACHABLE SIDE RING

Application filed January 19, 1923. Serial No. 613,585.

This invention relates generally to automobile rims, and more particularly to one having a quick detachable tire retaining ring at the outer side thereof.

Heretofore, this type of rim has been formed with an annular groove at the outer side thereof to receive the foot portion of the detachable ring, and the ring has been made from a hot rolled section.

The object of the present invention is to provide a rim which will dispense with the annular groove or channel and also employ a detachable ring which is made from flat cold rolled stock, and another object of the invention is to provide a rim embodying these advantageous features which can be easily attached to a disk wheel body or a wheel body having a flanged sheet metal felly.

Another object is to provide a rim possessing great strength and rigidity.

With these objects in view the invention consists in the various details of construction and in the manner of combining or arranging the same all of which will be fully described hereinafter and pointed out in the appended claims.

In the drawings forming a part of this specification Fig. 1 is a side view of a portion of a disk wheel showing a portion of the improved rim applied thereto; Fig. 2 is a plan view partly in section; Fig. 3 is a sectional view on the line 3—3 of Fig. 1 and Fig. 4 is a section on the line 4—4 of Fig. 1.

In carrying out my invention I provide a flat sheet metal rim base A terminating at one side in the tire engaging flange B, and at the other side there is provided an inwardly projecting flange C, which at its inner edge terminates in an inclined seat portion D, which is intended to seat or ride upon a correspondingly inclined seat portion in the wheel body as hereafter explained.

At spaced intervals the flange C is punched outwardly as shown at E providing a plurality of spaced sockets F at the edge of the rim base A and in punching the flange out to provide these sockets it is preferred to sever the metal only at the outer edge and not at the sides of the sockets. This is shown most clearly in Fig. 2, and this method adds greatly to the strength and rigidity of the rim and also the holding power of the sockets.

In connection with the rim base thus formed I employ a detachable tire retaining ring G which is rolled from flat stock instead of from a hot rolled section and the foot portion of this ring is formed into a plurality of socket engaging members H and a number of alternating flange engaging portions I which rest upon the outer side of the flange and contact with said outer side while the members H fit into the sockets F as most clearly shown in Figs. 1 and 2.

A rim constructed in this manner is cheap and easy to make and possesses great strength and rigidity and the quick detachable ring can be quickly and easily applied to and removed from the rim base as required.

Furthermore this ring can be made from flat cold rolled stock instead of the more expensive hot rolled section heretofore necessary.

The rim is applied to a wheel body, either disk or spoke structure, on which a felly portion is provided having the inclined seat portion J upon which the inclined foot piece D of the rim seats and also a leg K having a flange L upon which the inner side of the rim contacts but the tensioning takes place upon the contacting tapers D and J. Felly bolts M are employed passing through the flange C and nuts N complete the fastening operation.

Having thus described my invention, what I claim is:

1. A rim base having a tire engaging flange at one side and an inwardly extending flange at the opposite side, said flange having a plurality of laterally offset sockets punched therefrom at the junction of said flange and base and a detachable tire retaining ring having a flange portion and a foot portion, said foot portion having spaced portions fitting into the sockets and spaced portions engaging the outer side of the flange between the sockets.

2. A rim base having a tire engaging flange at one side thereof and an inwardly projecting flange at the other side, said flange having a plurality of laterally offset sockets punched therefrom at the junction of said flange and the base, the said flange terminating at its inner edge in an oblique foot portion adapted to seat upon the correspondingly shaped portion of a wheel body, and a detachable tire retaining ring having a flange portion and a foot portion, said foot portion having spaced portions fitting into the sockets and spaced portions engaging the outer side of the flange between the sockets.

3. The combination of a rim base having a tire engaging flange at one side and having an inwardly extending flange at the other side terminating in an inclined foot portion adapted to engage an inclined portion of a wheel body, said inwardly extending flange having spaced laterally offset sockets punched therefrom and a detachable ring having spaced inwardly extending portions adapted to fit into said sockets, said inwardly extending flange being adapted for engagement by means for securing the rim upon a wheel body.

In testimony whereof, I hereunto affix my signature.

JAMES H. WAGENHORST.